United States Patent [19]

Bambara et al.

[11] 4,160,289
[45] Jul. 3, 1979

[54] MICROPROGRAM-CONTROL UNIT FOR DATA PROCESSOR

[75] Inventors: Mario Bambara, Milan; Adriano Querze, Castelfranco Emiliano, both of Italy

[73] Assignee: Societa Italiana Telecomunicazioni Siemens S.p.A., Milan, Italy

[21] Appl. No.: 839,883

[22] Filed: Oct. 6, 1977

[30] Foreign Application Priority Data

Oct. 7, 1976 [IT] Italy ................. 28067 A/76

[51] Int. Cl.² .......................... G06F 9/16; G06F 9/20
[52] U.S. Cl. ................................................ 364/200
[58] Field of Search ... 364/200 MS File, 900 MS File

[56] References Cited
U.S. PATENT DOCUMENTS

| | | | |
|---|---|---|---|
| 3,593,313 | 7/1971 | Tomaszewski et al. | 364/200 |
| 3,930,236 | 12/1975 | Ferguson et al. | 364/200 |
| 3,972,024 | 7/1976 | Schroeder et al. | 364/200 |
| 3,990,054 | 11/1976 | Perlowski | 364/200 |
| 4,005,391 | 1/1977 | MacPherson | 364/200 |
| 4,038,533 | 7/1977 | Dummermuth et al. | 364/900 |
| 4,047,247 | 9/1977 | Stanley et al. | 364/200 |
| 4,050,058 | 9/1977 | Garlic | 364/200 |
| 4,064,554 | 12/1977 | Tubbs | 364/200 |

*Primary Examiner*—Mark E. Nusbaum

*Attorney, Agent, or Firm*—Karl F. Ross

[57] ABSTRACT

Macroinstructions stored in a program memory MP of a data processor, read out succesively under the control of a program counter PC, are decoded in a control unit CN which establishes a macroroutine for the transfer and processing of data within the processor as well as between the latter and associated peripheral units. The control unit comprises a microinstruction memory MM addressed by a microinstruction counter CC which is supplied with a starting address from an address store MI at the beginning of any microroutine as determined by a decoding of the final microinstruction of the immediately preceding microroutine. The address store contains 16 groups of 8 cells each; a logic network $RL_1$, responsive to various bit combinations from a primary decoder $DC_1$ and a secondary decoder $DC_2$ in an output circuit of microinstruction memory MM, selects one of the cells of a group activated by a multiplexer $MT_2$ whose operation depends on the presence or absence of a changeover command JM generated by the final microinstruction in the output of the primary decoder $DC_1$. The secondary decoder $DC_2$, activated by the changeover command JM, lies in the output of a preferential coder establishing certain priorities in the selection of the new starting address.

16 Claims, 3 Drawing Figures

MICROPROGRAM-CONTROL UNIT FOR DATA PROCESSOR

FIELD OF THE INVENTION

Our present invention relates to an electronic data processor and, more particularly, to a control unit for establishing microroutines in carrying out instructions extracted from a program memory of the read-only type in the processor.

BACKGROUND OF THE INVENTION

Such a processor generally comprises a program counter supplying the addresses of the program memory from which successive instructions forming part of a given program (referred to hereinafter as macroinstructions) are to be read out, partly by incrementing an existing address in consecutive timing cycles. These macroinstructions can be of several different types, such as transfer instructions, input/output instructions and branching instructions. A transfer instruction calls for the exchange of data between units of the processor by way of a logical execution network which usually performs switching as well as arithmetic operations. An input/output instruction requires the transmission of data between the processor and one of several peripheral units served by it. A branching instruction specifies a jump to a memory address other than the one immediately following the address of the previously extracted macroinstruction.

Each of these operations encompasses a number of steps which are part of a microprogram performed with the aid of the aforementioned control unit. Thus, the microroutine established by the control unit involves the readout of a series of microinstructions from a memory within that unit which is addressed by a microprogram counter in essentially the same way in which the program memory of the processor is addressed by its counter. More particularly, the microprogram counter has a loading input connected to an address store from which a reference address is fed in at the beginning of a microroutine. Depending on certain bit combinations in the microinstructions successively read out, as well as on signals from the processor and other external sources, the microprogram counter is stepped in consecutive timing cycles to increment its count or is loaded with a new reference address in response to a jump command. Such a jump command may occur in the course of a microroutine or at the end thereof; in the latter instance it calls for a changeover to a new microroutine requiring the loading of a fresh starting address into the microprogram counter. The new microroutine may involve the analysis of another macroinstruction extracted from the program counter of the processor; it could, however, also require the execution of a macroinstruction analyzed in the preceding microroutine.

Since the determination of the starting address for a new microroutine depends on a variety of external factors, including the character of the macroinstruction read out next and a possible interruption of the current program by a signal from a peripheral unit, several ancillary operations must be performed preparatorily to the initiation of each microroutine. In conventional systems, these ancillary operations require considerable time which slow down the actual processing of data.

OBJECT OF THE INVENTION

The object of our present invention, therefore, is to provide an improved control unit of the character discussed above which substantially eliminates the delays inherent in the conventional mode of operation of such data processors.

SUMMARY OF THE INVENTION

According to our present invention, a reference address to be loaded into the microprogram counter is identified by selection means with input connections to certain output leads of the program counter in the processor and with output connections to the address store of the control unit, these output leads of the program counter carrying bits of a forthcoming macroinstruction yet to be transmitted to an instruction register which holds a previously extracted macroinstruction analyzed by the microroutine in progress. Thus, the control unit has available characteristic bits from both the extracted and the forthcoming marcoinstruction as a basis for the selection of the new starting address.

According to a more particular feature of our invention, the control unit further comprises preferential circuitry for establishing an order of priority among different external signals originating at several sources such as the program memory and the associated peripheral units, including the aforementioned two types of characteristic bits. In the embodiment more fully described hereinafter, gating circuitry forming part of the address-selection means includes a multiplexer controlled by the preferential circuitry, a low-priority input of this multiplexer being connected to the aforementioned output leads of the program counter whereas a high-priority input thereof is connected to certain stages of the instruction register. The preferential circuitry comprises a priority coder having an input connection to the microinstruction memory for selectively activating either the high-priority or the low-priority input of the multiplexer in response to a discriminating bit forming part of an instruction word read out from that memory, specifically the least-significant bit of a code combination identifying the several jump addresses.

According to a further feature of our invention, the multiplexer also has an intermediate-priority input designed to receive an externally generated program-suspending signal transmitted to it from any of the several peripheral units according to a predetermined order of preference established by an ancillary priority coder.

BRIEF DESCRIPTION OF THE DRAWING

The above and other features of our invention will now be described in detail with reference to the accompanying drawing in which.

SPECIFIC DESCRIPTION

Figure 1:
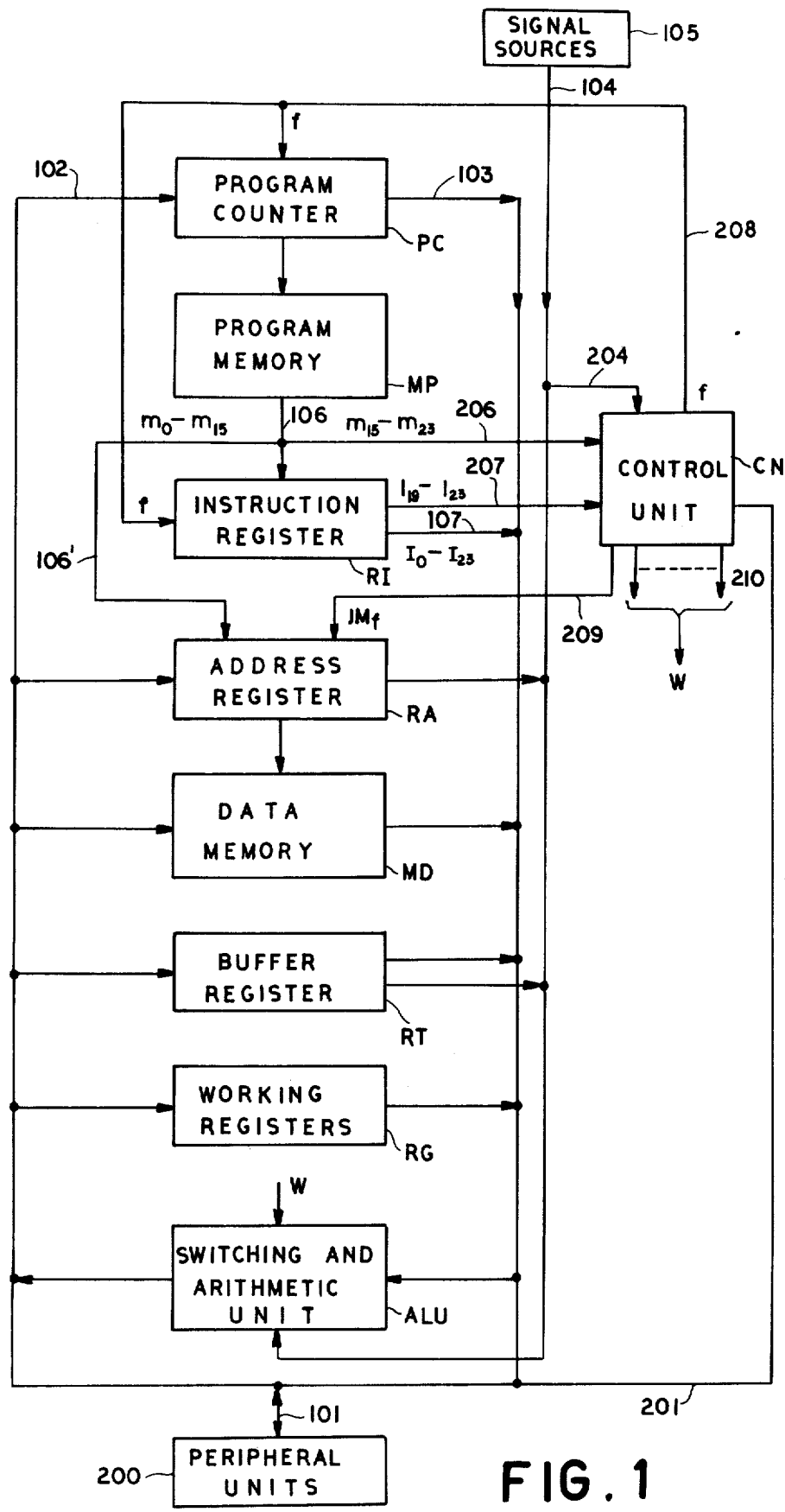
FIG. 1 is a block diagram showing a data processor provided with a control unit embodying our invention.

The electronic data processor 100 shown in FIG. 1, communicating with a multiplicity of peripheral units collectively designated 200, comprises a bidirectional bus 101 for the exchange of data with these peripheral units, a unidirectional bus 102 connected to the output of a logical switching and arithmetic unit ALU, a unidirectional bus 103 connected to an input of unit ALU, and a unidirectional bus 104 extending to another input of that unit from a group of signal sources 105 which may include a manually operable signal generator such as a keyboard as well as one or more generators of fixed reference voltages. A number of components connected between buses 102 and 103 (and through them to bus 101), in parallel with unit ALU, include a binary program counter PC connected to an address input of a program memory MP, a data memory MD with stage inputs connected to a register RA, a buffer register RT and a group of working registers RG. Memory MP has an output multiple (i.e. a group of outgoing lines) 106 terminating at an instruction register RI, with branches 206 and 106' respectively extending to a control unit CN and to the address register RA connected between buses 102 and 104. Instruction register RI has an output multiple 107, terminating at bus 103, and another output multiple 207 extending to control unit CN. Buses 101 and 104 have branches 201 and 204 leading to the control unit from which a lead 208 carries a stepping signal f to components PC and RI, a lead 209 feeds an enabling signal $JM_f$ to register RA, and a multiple 210 supplies microcommands W to the execution part of processor 100 consisting essentially of unit ALU. Register RT also has an output connected to bus 104.

Program memory MP, which is of the read-only type, contains a multiplicity of macroinstructions appearing on the leads of its output multiple 106 upon being called fourth by corresponding address codes emitted by program counter PC. The macroinstructions here considered consist of 24 bits each, designated $I_0$–$I_{23}$ and stored in respective stages of register RI, and are of three types respectively shown in the following Tables I, II and III.

TABLE I:

Transfer Instruction

| operative code (1-x-x-x-x) $I_{23}$–$I_{19}$ | addressing mode $I_{18}, I_{17}$ | not utilized $I_{16}$–$I_{14}$ | operand address $I_{13}$–$I_0$ |
|---|---|---|---|

TABLE II:

Input/Output Instruction

| operative code (0-0-0-0-0) $I_{23}$–$I_{19}$ | function code $I_{18}$–$I_{15}$ | not utilized $I_{14}$–$I_{12}$ | micro-commands $I_{11}$–$I_9$ | state of peripheral unit $I_8, I_7$ | address of peripheral unit $I_6$–$I_0$ |
|---|---|---|---|---|---|

TABLE III:

Branching Instruction

| operative code (0-0-0-x-x) $I_{23}$–$I_{19}$ | addressing mode $I_{18}, I_{17}$ | not utilized $I_{16}$ | operand address $I_{15}$–$I_0$ |
|---|---|---|---|

In the present instance, each of these instructions has an operative code constituted by the five highest-ranking bits $I_{19}$–$I_{23}$. Bit $I_{23}$ is of logical value "1" in a transfer instruction (Table I) but of logical value "0" in an input-/output instruction (Table II) and in a branching instruction (Table III). The operative code of an input/output instruction consists of five zeroes. In the operative code of a branching instruction the first three bits $I_{23}$, $I_{22}$, $I_{21}$ are "0" whereas at least one of the next two bits $I_{20}$ and $I_{19}$ is "1".

Unit ALU intervenes in the execution of any of these instructions, i.e., in the entry of data in the read/write memory MD or in any of registers RA, RT, RG, in the exchange of data with peripheral units 200, and in the entry of a jump address in counter PC.

In the transfer and branching instructions, bits $I_{17}$ and $I_{18}$ specify one of several different modes of addressing, namely direct addressing, indirect addressing and indexed addressing (i.e. extraction of an address code from a special register). The 14-bit operand address of a transfer instruction, consisting of bits $I_0$–$I_{13}$, gives the location in memory MD of data to be processed. The corresponding part of a branching instruction, consisting of the 16 bits $I_0$–$I_{15}$, provides — directly, with indexing or upon modification in unit ALU — the new address to be loaded after a jump into program counter PC. In an input/output instruction, the function code (bits $I_{15}$–$I_{18}$) specifies the kind of operation to be performed on the peripheral unit whose address is represented by the last seven bits $I_0$–$I_6$; the microcommand section (bits $I_9$–$I_{11}$) controls the emission of preliminary signals (e.g. timing pulses) required to condition the designated peripheral unit for the transmission or reception of data, whereas the bit pair $I_7$, $I_8$ serves to indicate the state which such peripheral unit must assume in the data exchange.

Multiple 201 informs the control unit CN whether, at any step in the program, the necessary preliminary conditions exist. This multiple also carries messages from the peripheral units calling for a temporary halt in the current sequence of operations, with intercalation of a different microroutine before the program is resumed.

Figure 2:
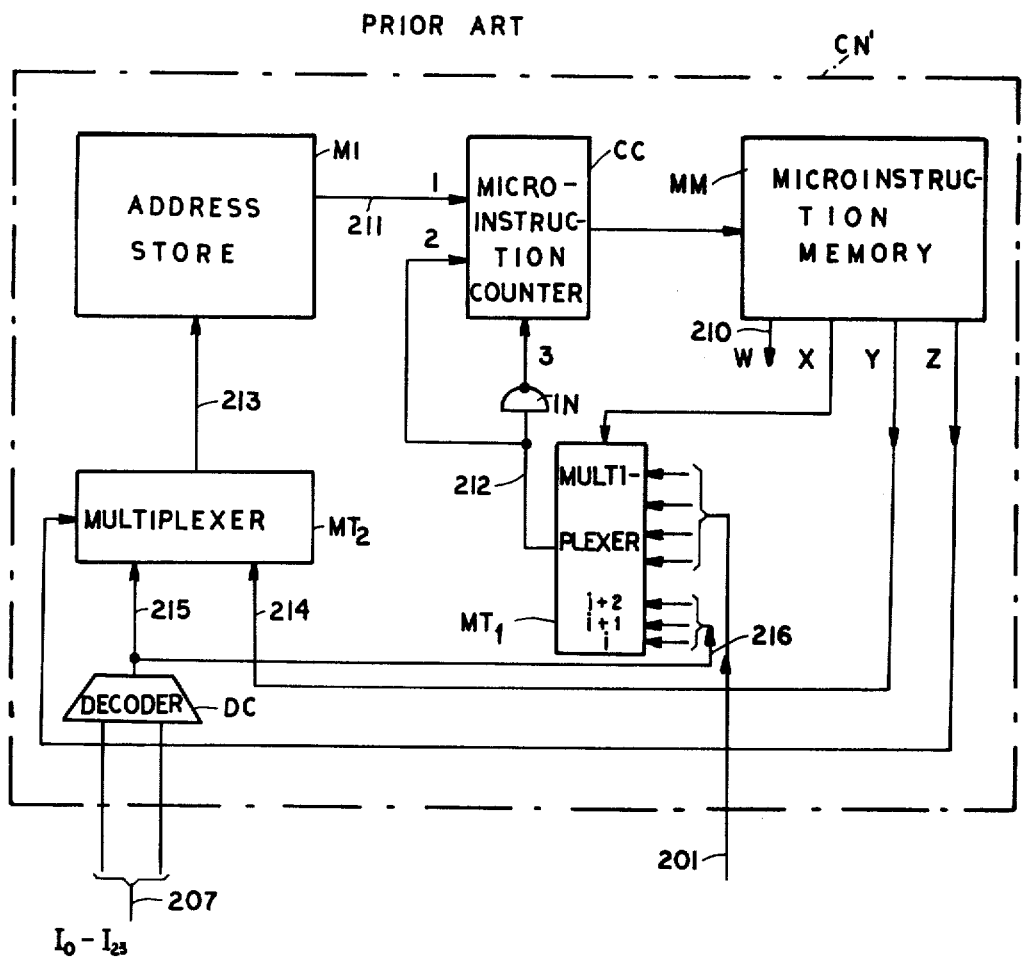
FIG. 2 is a block diagram showing, for the sake of comparison, a conventional control unit for the processor of FIG. 1.

We shall now describe, with reference to FIG. 2, the way in which a conventional control unit CN' handles these tasks. Unit CN' comprises a microinstruction memory MM with an address input connected to the output of a binary microinstruction counter CC, the latter having a loading input 1, an enabling input 2 and a stepping input 3. Loading input 1 is linked by a multiple 211 to an address store MI. A multiplexer $MT_1$ has an output lead 212 connected directly to enabling input 2 and through an inverter IN to stepping input 3; energization of input 2 makes the counter receptive to a reference address read out from store MI. Another multiplexer $MT_2$ has an output multiple 213 for transmitting to that store a bit combination identifying the address to be fed next into the counter. A decoder DC receives the bits $I_0$–$I_{23}$ of an extracted macroinstruction appearing on multiple 207; the output signals of this decoder are delivered to respective data inputs 215, 216 of multiplexers $MT_1$ and $MT_2$. Multiplexer $MT_1$ has other data inputs connected to multiple 201 and a switching input tied to an output multiple of memory MM carrying scanning signals X which form part of a binary microinstruction read out from that memory; see Table IV below. Other parts of that microinstruction are the microcommands W on outgoing multiple 210, a bit group Y fed to a data input 214 of multiplexer $MT_2$ to identify various jump addresses in store MI, and a bit Z constructing a jump command which switches the multiplexer $MT_2$ from its input 214 to its input 215 upon completion of a microroutine.

TABLE IV:

Conventional Microinstruction (FIG. 2)

| microcommands W | scanning signals X | jump addresses Y | jump command Z |
|---|---|---|---|

In this conventional system, a new microroutine is initiated by the extraction of a macroinstruction from program memory MP (FIG. 1) under the control of a first instruction word, read out from microinstruction memory MM, which increments the contents of program counter PC to let the new macroinstruction appear in the output 106 of memory MP, followed by the entry of that macroinstruction in register RI under the control of a second instruction word from memory MM whereby the bits $I_0$–$I_{23}$ of the extracted macroinstruction appear on multiple 207 in the input of decoder DC. In this case, of course, the leads of multiple 207 would have to be connected to all the stage outputs of register RI whereas in the system of FIG. 1 they are shown to originate only at the stage outputs carrying the bits $I_{19}$–$I_{23}$. The operative code (which in the prior art may consist of eight bits for an input/output instruction) energizes one of several terminals i, i+1, i+2, forming part of data input 216 of multiplexer $MT_1$, which are successively explored by the scanning signal X. Let us assume, for example, that a transfer instruction energizes terminal i, a branching instruction energizes terminal i+1, and an input/output instruction energizes terminal i+2. Thus, if the macroinstruction present on multiple 207 is of the last-mentioned type, the scanning signal emitted by memory MM in the third cycle of the new microroutine switches output lead 212 to input terminal i which is not energized; as a result, inverter IN conducts and steps the counter CC whose incremented count now switches lead 212 to input terminal i+1. Since the latter terminal is also not energized, counter CC is stepped again whereupon in the fifth cycle the voltage present on terminal i+2 is transmitted to counter input 2, causing a jump to a new starting address provided by store MI in response to the characteristic bits on multiple 207. It is only at this point that the actual execution of the macroinstruction can begin.

If indirect addressing is involved in that execution, calculation of the address requires further steps in the micro-routine now established. Moreover, the evolution of the micro-routine depends on the occurrence or nonoccurrence of certain events as communicated via multiple 201 to other data inputs of multiplexer $MT_1$. Once execution is completed, extraction of the next macroinstruction from memory MP may have to be deferred in response to a program-suspending signal coming in from one of the associated peripheral units.

Figure 3:
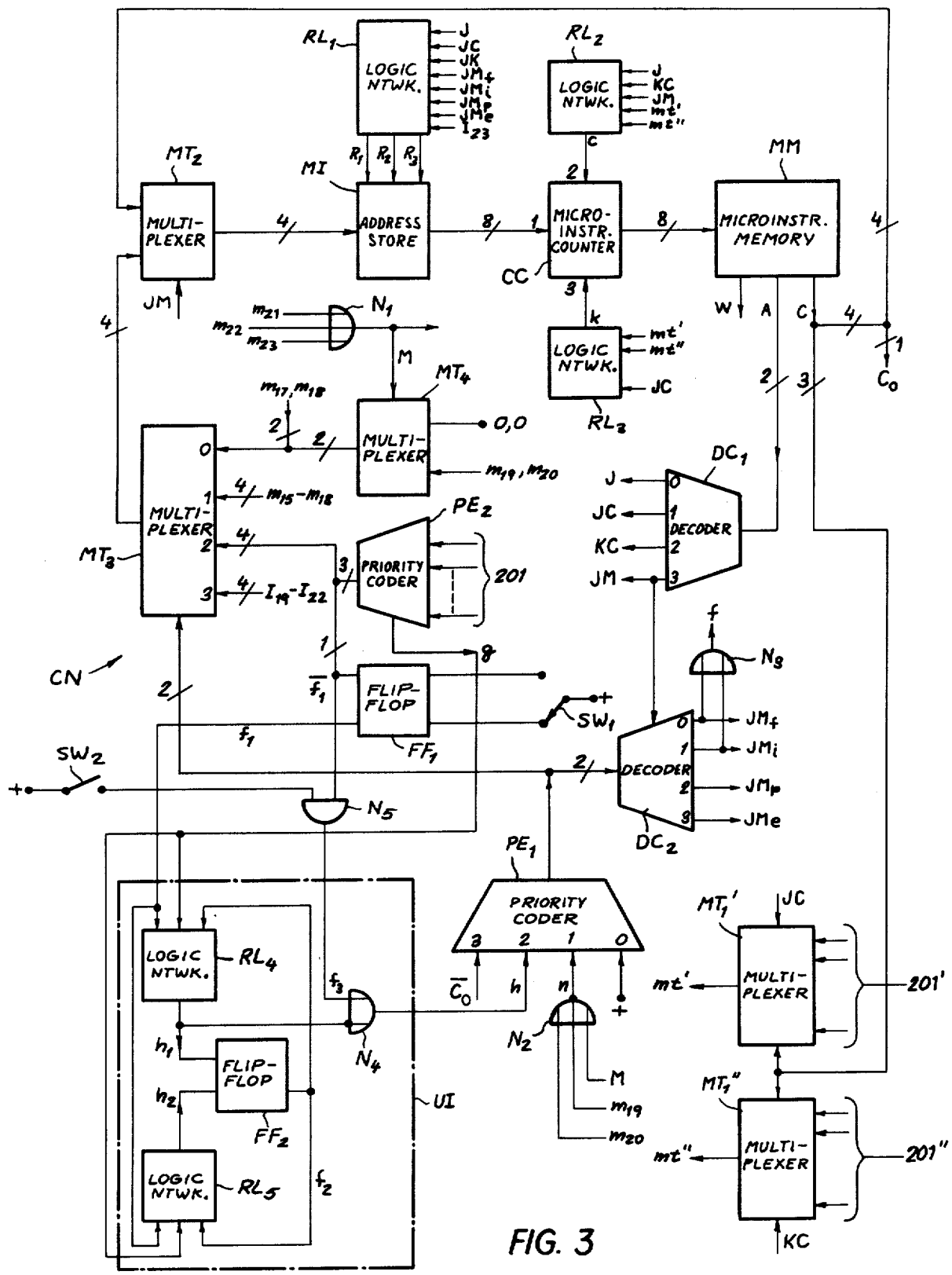
FIG. 3 is a more detailed diagram of the control unit according to our invention.

We shall now describe, with reference to FIG. 3, a control unit CN according to our invention which eliminates the wasted extraction and scanning cycles of the conventional system.

Table V shows the type of instruction word used in the control unit CN.

TABLE V:

Modified Microinstruction (FIG. 3)

| microcommands W | evolution code A ($A_1$,$A_2$) | jump addresses C ($C_3$–$C_0$) |
|---|---|---|

The control unit CN shown in FIG. 3 has the same basic constituents as the conventional unit CN' of FIG. 2, namely an address store MI connected to a loading input 1 of a microinstruction counter CC connected to an address input of a microinstruction memory MM. Multiplexer $MT_1$ of FIG. 2 is here replaced by a pair of normally inactive multiplexers $MT_1'$, $MT_1''$ with data inputs designed to receive various conditioning signals from submultiples 201' and 201'' of multiple 201. These multiplexers have scanning inputs connected in parallel to three leads of a four-lead output multiple of memory MM carrying the three highest-ranking bits $C_1$, $C_2$ and $C_3$ of the jump-address code C forming part of the instruction word shown in Table V. All four bits of this code, including the least-significant bit $C_0$, are fed to a data input of a multiplexer $MT_2$ which, like its counterpart in FIG. 2, controls the reading of addresses from store MI. (In FIG. 3 the number of leads in any multiple has been conventionally indicated by a slanting cross-stroke and an adjoining numeral.)

The single decoder DC shown in FIG. 2 has been replaced in FIG. 3 by a primary decoder $DC_1$ and a secondary decoder $DC_2$, the former receiving from memory MM the evolution code A consisting of two bits $A_1$, $A_2$. According to the configuration of these bits, decoder $DC_1$ energizes one of its four outputs with a signal J, JC, KC or JM whose significance will be explained below. Signal JM goes, inter alia, to an enabling input of decoder $DC_2$ with four outputs carrying respective signals $JM_f$, $JM_i$, $JM_p$ and $JM_e$. The data input of decoder $DC_2$ is tied via a two-lead multiple to the output of a priority coder $PE_1$. The same multiple also extends to a switching input of a multiplexer $MT_3$ with four data inputs and a four-bit output tied to another data input of multiplexer $MT_2$. In the presence of signal JM from the No. 3 output of decoder $DC_1$, applied to a switching input of multiplexer $MT_2$, that multiplexer delivers the output signals of multiplexer $MT_3$ to address store MI in lieu of the bits C from memory MM.

In the present instance, store MI has 128 cells containing as many addresses, these cells being divided into 16 groups of 8 cells each. The four-bit combination issuing from multiplexer $MT_2$ activates one of these 16 groups to enable the selection of one of its 8 cells by a logic network $RL_1$ for the loading of its address into counter CC. Network $RL_1$ has three output leads carrying bits $R_1$, $R_2$ and $R_3$. These leads terminate within store MI at a nonillustrated decoder whose eight outputs are connected in parallel to homologous cells of the 16 groups. Thus, any cell within store MI is uniquely defined by the three bits $R_1$, $R_2$, $R_3$ plus the four bits from multiplexer $MT_2$.

The evolution of a microprogram is monitored by two further logic networks $RL_2$ and $RL_3$ which feed into the enabling and stepping inputs 2 and 3, respectively, of counter CC. Energization of enabling input 2 by a jump signal c from network $RL_2$ makes the counter receptive to a new binary address appearing in its loading input 1; on the other hand, an advancing signal k applied to stepping input 3 by network $RL_3$ increments the address then present in the counter by a value of unity. Counter CC has an eight-lead output multiple allowing the readout of up to 512 instruction words from microinstruction memory MM.

Network $RL_1$ has eight inputs respectively receiving the signals J, JC, JK, $JM_f$, $JM_i$, $JM_p$, $JM_e$ from decoders $DC_1$ and $DC_2$ as well as the most-significant bit $I_{23}$ of an extracted macroinstruction from multiple 207 originating at register RI of FIG. 1.

Network $RL_2$ has five inputs receiving respective output signals mt' and mt'' from multiplexers $MT_1'$ and $MT_1''$ in addition to signals J, KC and JM from decoder $DC_1$. Network $RL_3$ has three inputs respectively energizable by signals mt', mt'' and JC.

Signal J, occurring in the course of a microroutine, commands an unconditional jump and, accordingly, results in the immediate energization of enabling input 2 of counter CC. Signal JC represents a conditional jump and activates the multiplexer $MT_1'$ which at this instant explores one of its data inputs, under the control of bits $C_1$–$C_3$, to determine whether or not a certain event has occurred; if so, output signal mt' emitted by this multiplexer also produces the jump signal c in the output of network $RL_2$. If the event has not occurred, signal k appears in the output of network $RL_3$ to step the counter CC. Signal KC, calling for a conditional advance, has the opposite effect; the presence of an output signal mt'' from multiplexer $MT_1''$, activated by signal KC, energizes the stepping input 3 of counter CC whereas the absence of signal mt'' energizes its enabling input 2. Signals J, JC and KC may be referred to as switching signals.

Signal JM, occurring in contrast to these switching signals at the end of a micro-routine, constitutes a changeover command which also gives rise to the jump signal c in addition to activating the decoder $DC_2$ and switching the multiplexer $MT_2$. Priority coder $PE_1$ then determines the emission of signal $JM_f$, representing an extraction command for a branching or transfer instruction, signal $JM_i$, signifying a similar command for an input/output instruction, signal $JM_p$, effecting a program interruption, or signal $JM_e$, initiating the execution of an extracted macroinstruction.

Bits $R_1$, $R_2$ and $R_3$ are generated in accordance with the following equations:

$$R_1 = (\overline{JM_e} + I_{23}) \cdot \overline{JC} \cdot \overline{JM_p} \cdot \overline{JM_f} \tag{1}$$

$$R_2 = KC + JC + JM_f + JM_i \tag{2}$$

$$R_3 = \overline{KC} \cdot \overline{JC} \cdot \overline{J} \cdot \overline{JM_p} \tag{3}$$

The foregoing equations can also be represented by a truth table, as follows:

TABLE VI

|  | $R_1$ | $R_2$ | $R_3$ |
|---|---|---|---|
| unconditional jump (J) | 1 | 0 | 0 |
| conditional jump (JC) | 0 | 1 | 0 |
| conditional advance (KC) | 1 | 1 | 0 |
| extraction of branching or transfer instruction ($JM_f$) | 0 | 1 | 1 |
| extraction of input/output instruction ($JM_i$) | 1 | 1 | 1 |
| program interruption ($JM_p$) | 0 | 0 | 0 |
| execution of branching or input/output instruction | 0 | 0 | 1 |

TABLE VI-continued

|  | $R_1$ | $R_2$ | $R_3$ |
|---|---|---|---|
| ($JM_e$) execution of transfer instruction ($JM_e \cdot I_{23}$) | 1 | 0 | 1 |

The output signals c and k of networks $RL_2$ and $RL_2$ conform to the following equations:

$$c = KC \cdot \overline{mt''} + J + mt' + JM \tag{4}$$

$$k = JC \cdot \overline{mt'} + mt'' \tag{5}$$

Multiplexer $MT_3$ has four data inputs of four bits each. The first of these inputs (No. 0) receives the bits $m_{17}$, $m_{18}$ of a forthcoming macroinstruction, appearing as part of the bit group $m_{15}$–$m_{23}$ on output multiple 206 whose leads are connected to certain stages of program memory MP, along with two further bits on an output multiple of a multiplexer $MT_4$. A switching input of multiplexer $MT_4$ is connected to the output of an OR gate $N_1$ receiving the bits $m_{21}$–$m_{23}$ on its three inputs. A switching signal M is thus generated by OR gate $N_1$ whenever the macroinstruction present in the output of program memory MP (FIG. 1), but not yet entered in instruction register RI, is a transfer instruction having a bit "1" in at least one of its three highest-ranking positions (cf. Table I); such a switching signal connects the output of multiplexer $MT_4$ to its upper input which is fixedly wired to low voltage so that the No. 0 input of multiplexer $MT_3$ receives two bits of value "0" besides bits $m_{17}$, $m_{18}$. If, however, the forthcoming macroinstruction is of the branching type (Table III), multiplexer $MT_4$ stands on its lower input which supplements the bits $m_{17}$, $m_{18}$ by the bits $m_{19}$, $m_{20}$ received from memory MP; the latter two bits identify any of four possible types (direct, indirect and indexed via two different reference registers) of branching instruction.

For reasons that will appear hereinafter, an input/output instruction does not find the output of multiplexer $MT_3$ connected to its No. 0 input; under the circumstances referred to, therefore, bits $m_{19}$ and $m_{20}$ will never have the logical value "0-0". The No. 1 input of multiplexer $MT_3$ receives bits $m_{15}$–$m_{18}$ via multiple 206 from program memory MP.

Three of the leads terminating at the No. 2 input of multiplexer $MT_3$ originate at the output of an ancillary priority coder $PE_2$ whose several inputs can receive program-suspending requests from the various peripheral units 200 (FIG. 1) via multiple 201. A fourth lead extending to this No. 2 input originates at the reset output of a flip-flop $FF_1$ which is normally set by a manual switch $SW_1$.

Finally, the No. 3 input of multiplexer $MT_3$ is connected to a part of multiple 207 carrying bits $I_{19}$–$I_{22}$ of an extracted macroinstruction from register RI.

The set output of flip-flop $FF_1$ normally carries a consent signal $f_1$ which, together with an interrupter signal g generated by coder $PE_2$ in the presence of any incoming program-suspending request, goes to a subunit UI comprising a pair of logic networks $RL_4$, $RL_5$ generating mutually exclusive signals $h_1$ and $h_2$ according to the following formulas:

$$h_1 = \overline{(g \cdot f_1 \cdot \overline{f_2})} \cdot JM \cdot C_0 \tag{6}$$

$$h_2 = g \cdot f_1 \cdot \overline{f_2} \cdot JM \cdot C_0 \tag{7}$$

In the foregoing equations, $f_2$ is a signal appearing on the set output of a flip-flop $FF_2$ upon energization of its setting input by signal $h_2$ from network $RL_5$. Signal $h_1$, when emitted by network $RL_4$, is fed to the resetting input of this flip-flop. Signal $h_1$ is also transmitted to an inverting input of an OR gate $N_4$ whose other, noninverting input is tied to the output of an AND gate $N_5$ generating a signal $f_3$ in its conductive state. Signal $f_3$ comes into existence upon closure of a manual switch $SW_2$, applying high voltage to an input of AND gate $N_5$, in the reset state of flip-flop $FF_1$ (i.e. upon reversal of switch $SW_1$ from its illustrated position) whose reset output carrying signal $\overline{f_1}$ is tied to the other input of this AND gate.

Priority coder $PE_1$ has four inputs whose individual energization switches the multiplexer $MT_3$ to its correspondingly designated input and also causes the appearance of a signal in an output of decoder $DC_2$ bearing the same designation. The No. 0 input of coder $PE_1$ is permanently connected to high voltage. Its No. 1 input is tied to the output of a NOR gate $N_2$ with three inputs respectively carrying signal M from OR gate $N_1$ and bits $m_{19}$, $m_{20}$ from program memory MP (FIG. 1); if none of these inputs is energized, NOR gate $N_2$ emits a signal n indicative of a forthcoming input/output instruction (cf. Table II). OR gate $N_4$, in the presence of either a signal $h_1$ or a signal $f_3$, feeds an output signal h to the No. 2 input of coder $PE_1$. The highest-ranking input, No. 3, of this priority coder is connected, by way of a nonillustrated inverter, to the output lead of memory MM carrying the least-significant bit $C_0$ of the jump-address code C.

In the absence of bit $C_0$, i.e. with $\overline{C_0}=1$, input No. 3 of coder $PE_1$ is energized and causes emission of the execution signal $JM_e$ by decoder $DC_2$ while bits $I_{19}-I_{22}$ of an extracted macroinstruction are transmitted from multiplexer $MT_3$ via multiplexer $MT_2$ as a group-selection signal to address store $MI_1$, provided that the changeover command JM has been generated by decoder $DC_1$ to indicate the end of a microroutine. Signal $\overline{C_0}$, in that instance, overrides a possible signal h from interrupter subunit UI on the No. 2 coder input. With $\overline{C_0}=0$; signal h results in the emission of program-interruption signal $JM_p$ from decoder $DC_2$ while a suspension request from one of the peripheral units, available at the output of priority coder $PE_2$, is gated by multiplexers $MT_3$ and $MT_2$ as a group-selection signal into address store MI. If neither of the two highest-ranking inputs of coder $PE_1$ is energized, the presence of a five-0 operative code in the output of program memory MP generates the signal n and brings forth the extraction command $JM_i$ on the No. 2 output of decoder $DC_2$, identifying the forthcoming macroinstruction as being of the input/output type; at the same time the function code consisting of bits $m_{15}-m_{18}$ of this forthcoming instruction is passed by multiplexers $MT_3$ and $MT_2$ to address store MI. If none of the three higher-priority inputs of coder $PE_1$ carries voltage, decoder $DC_2$ emits the extraction command $JM_f$ while bits $m_{17}$ and $m_{18}$ defining the addressing mode are transmitted from the corresponding input of multiplexer $MT_3$, together with bits $m_{19}$, $m_{20}$ or the two "0" bits delivered by multiplexer $MT_4$, through multiplexer $MT_2$ to address store MI.

The No. 0 and No. 1 outputs of decoder $DC_2$ are connected to respective inputs of an OR gate $N_3$ generating in its output the stepping signal f transmitted to the processor 100 of FIG. 1. Signal f loads the register RI of the processor with the new macroinstruction appearing on output multiple 106 of program memory MP and thereafter, on its trailing edge, increments the contents of program counter PC so that a new macroinstruction presents itself on that output multiple. Bits $m_0-m_{15}$ of the new instruction, containing the operand address, are fed at this point to a writing input of address register RA.

All the described operations are controlled, in a manner known per se, by a nonillustrated timer establishing the successive cycles of a microroutine.

As will be apparent from the foregoing, an execution signal emitted by memory MM at the end of a microroutine (i.e. coincidence of bit $C_0$ with an evolution code such as $A_1=A_2=1$ resulting in the emission of changeover command JM) takes precedence over situations calling for either a program interruption or the extraction of a new macroinstruction. Program interruption in response to requests from peripheral units can be inhibited by a reversal of manual switch $SW_1$ and, in the atter switch position, can be induced by an operator closing the manual switch $SW_2$.

Since subunit UI produces signal $h_1$ or $h_2$ only in the presence of changeover command JM as well as bit $C_0$, according to equations (6) and (7), these signals disappear upon the start of a new microroutine and cannot be regenerated until command JM recurs unaccompanied by discriminating bit $\overline{C_0}$. Upon such recurrence, flip-flop $FF_2$ will invariably be switched to its alternate state, i.e. reset if previously set or vice versa, thanks to the presence of its output signal $f_2$ in the equations for its input signals $h_1$ and $h_2$. Thus, program interruptions cannot occur at the conclusions of two immediately consecutive microroutines but must be separated by an operation involving the extraction of a new macroinstruction.

From the foregoing description of the operation of multiplexer $MT_3$ and logic network $RL_1$ it will be seen that our improved control unit CN provides a choice among 44 microroutines for the processing of instructions about to be extracted from program memory MP, i.e. 16 each for transfer and input/output instructions (distinguished in network $RL_1$ by the value of bit $I_{23}$) and 12 for branching instructions.

We claim:

1. In an electronic data processor serving a number of peripheral units and including a program memory containing binary macroinstructions, a program counter steppable to make the bits of successive macroinstructions of a given program available at respective output leads of said program memory, an instruction register with respective stages connected to said output leads for temporarily storing a current macroinstruction extracted from said program memory, and execution means connected to said instruction register for carrying out data-processing operations specified by the extracted macroinstructions, the combination therewith of a control unit executing a microroutine for carrying out any extracted macroinstruction, said control unit comprising:

a microinstruction memory with an address input and with output means connected to said execution means;

logical circuitry responsive to external signals and to microinstruction words read out from said microinstruction memory for determining the execution of a microroutine in progress and the changeover to a new microroutine following the one in progress;

a microprogram counter having an output connected to said address input for identifying successive microinstruction words for readout from said microinstruction memory;

an address store connected to a loading input of said microprogram counter for supplying same with a reference address, said microprogram counter further having a stepping input activable for progressively incrementing the reference address last entered therein and an enabling input activable to replace the latter address with one appearing in said loading input;

decoding means in said logical circuitry connected to said output means for generating switching signals alternatively activating said stepping and enabling inputs in response to the microinstruction words read out during a microroutine, said decoding means generating a changeover command invariably activating said enabling input in response to a final microinstruction word read out at the end of a microroutine; and selection means with input connections to certain stage outputs of said instruction register and to certain output leads of said program memory and with output connections to said address store for identifying a reference address, to be entered in said microprogram counter, in response to bits of the read-out microinstruction word upon activation of said enabling input by a switching signal and in response to external signals upon activation of said enabling input by a changeover command, said external signals including bits of an extracted macroinstruction appearing on said certain stage outputs and bits of a forthcoming macroinstruction immediately following said extracted macroinstruction appearing on said certain output leads.

2. The combination defined in claim 1, further comprising monitoring means in said logical circuitry responsive to conditioning signals from said peripheral units for modifying the effect of said switching signals upon said stepping and enabling inputs.

3. The combination defined in claim 2 wherein said selection means includes a first logic network with input connections to said decoding means, said monitoring means including a second logic network connected to said enabling input and a third logic network connected to said stepping input, said second and third logic networks also having input connections to said decoding means.

4. The combination defined in claim 3 wherein said address store comprises a multiplicity of cells evenly divided into a plurality of groups, said first logic network having a plurality of output leads each connected in parallel to homologous cells of said groups, said selection means further including gating circuitry controlled by said decoding means and by characteristic bits appearing on said output leads for activating any one of said groups, said first logic network determining within an activated group a cell whose contents are to be entered in said microprogram counter.

5. The combination defined in claim 4, further comprising preferential circuitry for establishing an order of priority among different external signals, said gating circuitry including a multiplexer controlled by said preferential circuitry.

6. The combination defined in claim 5 wherein said multiplexer has a low-priority input connected to said certain output leads for receiving characteristic bits of a forthcoming macroinstruction and a high-priority input connected to certain stage outputs for receiving characteristic bits of an extracted macroinstruction.

7. The combination defined in claim 6 wherein said preferential circuitry has an output connection to said program counter and to said instruction register for stepping said program memory and transferring a forthcoming macroinstruction to said instruction register upon activation of said low-priority input.

8. The combination defined in claim 7 wherein the processor further includes an address register connected to some of the output leads of said program memory, said address register having a writing input connected to said preferential circuitry for receiving from said program memory an operand address, forming part of an extracted macroinstruction, upon activation of said low-priority input.

9. The combination defined in claim 6 wherein said preferential circuitry comprises a priority coder having an input connection to said microinstruction memory for selecting between said high-priority and low-priority inputs in response to a discriminating bit forming part of a read-out microinstruction word.

10. The combination defined in claim 9, further comprising interrupter means connected to said priority coder for activating an intermediate-priority input of said multiplexer in response to an externally generated program-interrupting command, said intermediate-priority input being connected to receive address-selection signals from said peripheral units.

11. The combination defined in claim 10, further comprising ancillary coding means connected to said intermediate-priority input for establishing a predetermined order of preference among said address-selection signals.

12. The combination defined in claim 10 wherein said interrupter means comprises a switching circuit responsive to said changeover command for preventing the activation of said intermediate-priority input at the end of a microroutine immediately preceded by a program interruption.

13. The combination defined in claim 12, further comprising switch means actuatable to generate an inhibiting signal fed to said switching circuit for deactivating said interrupter means.

14. The combination defined in claim 12, further comprising signal-generating means actuatable independently of said interrupter means to activate said intermediate-priority input.

15. The combination defined in claim 9 wherein said decoding means comprises a primary decoder emitting said switching signals and said changeover command, and a secondary decoder connected to said priority coder and enabled by said changeover command to control said first logic network for determining the cell of said address store whose contents are to be loaded into said microprogram counter.

16. The combination defined in claim 15 wherein said primary decoder is connected to a pair of stage outputs of said microprogram memory for selectively emitting said switching signals and said changeover command, said monitoring circuitry further including a pair of multiplexers connected to said primary decoder for respective enablement by conditional-jump and conditional-advance commands included among said switching signals.

* * * * *